Feb. 14, 1939.  A. N. SPANEL  2,147,504
CAP
Original Filed Dec. 11, 1935
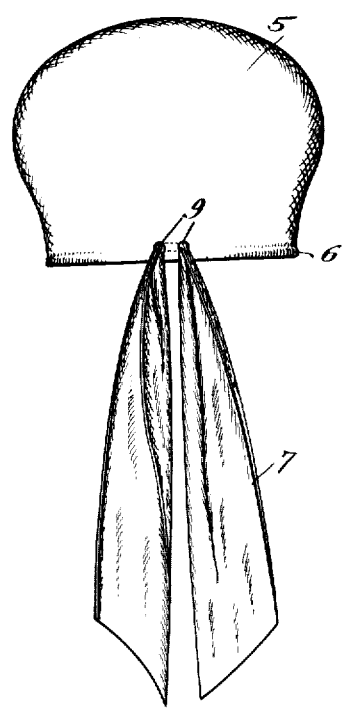
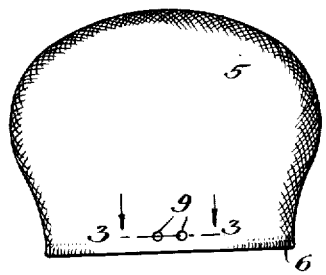
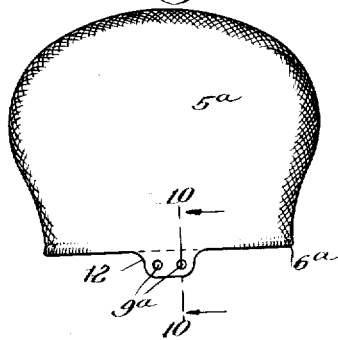
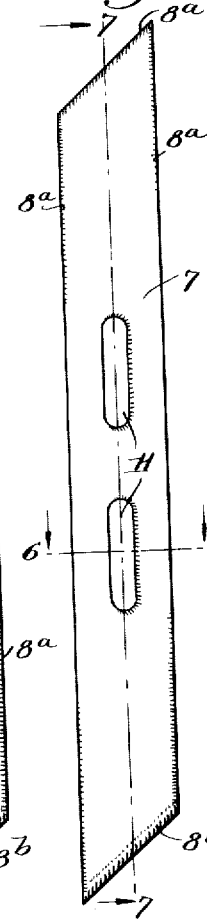
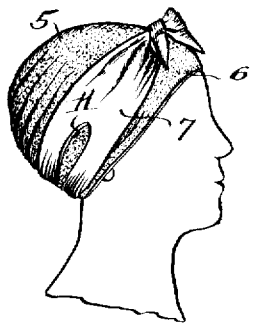
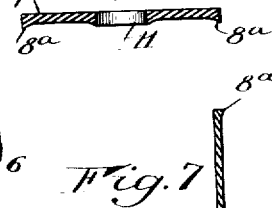
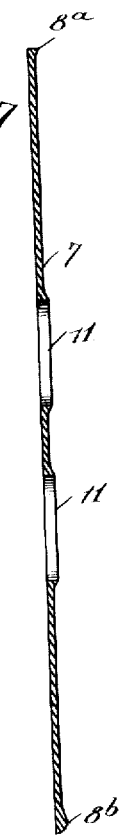
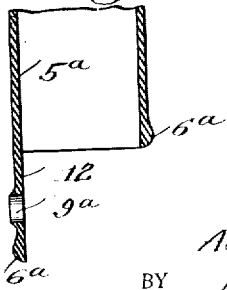
INVENTOR.
Abraham N. Spanel
BY D. Clyde Jones
his ATTORNEY.

Patented Feb. 14, 1939

2,147,504

UNITED STATES PATENT OFFICE 2,147,504

CAP

Abraham N. Spanel, Rochester, N. Y.

Original application December 11, 1935, Serial No. 53,923. Divided and this application August 26, 1936, Serial No. 97,985

1 Claim. (Cl. 2—68)

This invention relates to rubber or latex articles and more particularly to rubber bathing caps and the like.

This application is a division of copending application Serial No. 53,923, filed December 11, 1935.

In the past dipped rubber bathing caps while they have been durable and satisfactory in service, have not always prevented leakage of water between the edge of the cap and the head of the wearer. Furthermore, with such bathing caps it has been difficult to produce decorative patterns thereon or to obtain varied style effects.

In accordance with the present invention, there is provided a dipped rubber bathing cap with a strip constituting a part thereof which can be tied about the wearer's head whereby a more efficient water seal between the edge of the cap and the head of the wearer is obtained and whereby various decorative and style effects may be obtained with the cap.

The various features and advantages of the invention will appear from the detailed description and claim when taken with the drawing in which Fig. 1 is a front elevation of a rubber bathing cap provided with a tying strip in accordance with the present invention; Fig. 2 is a rear view of the cap proper of Fig. 1; Fig. 3 is a fragmentary section of this cap taken on the line 3—3 of Fig. 2 illustrating the reinforcement of the cap at the openings therein; Fig. 4 is a plan view of a rubber strip for use with the cap as illustrated in Fig. 1; Fig. 5 is a view of a rubber strip similar to that shown in Fig. 4 except that it has openings therein for decorative effect; Fig. 6 is a cross section of the last-mentioned strip taken on the line 6—6 of Fig. 5; Fig. 7 is a longitudinal section thereof taken on the line 7—7 also of Fig. 4; Fig. 8 is a perspective view indicating one of the many ways in which the cap may be worn; Fig. 9 is a rear elevation of a modified type of cap in accordance with the present invention; Fig. 10 is a fragmentary sectional view thereof taken on the line 10—10 of Fig. 9.

Referring especially to Fig. 1 of the drawing, 5 designates a thin rubber or latex bathing cap preferably made from an aqueous dispersion of rubber according to a method and with apparatus similar to that disclosed in the patent to Spanel, et al. #1,933,397, granted October 31, 1933. The cap at the head opening therein has the margin 6 reinforced by an integral bead of rubber which is substantially semi-oval or semi-pear shaped in cross section. This cap is provided with a tying strip 7 which is attached to the cap in any suitable manner. The top and two long edges of the tying strip (as illustrated) are preferably reinforced by an angular accumulation of rubber 8a which terminates in a torn or feather edge, while the lower end of the tying strip preferably terminates in an accumulation 8b of rubber, semi-oval or semi-pear shaped in cross section. As herein illustrated, the lower margin of the cap is provided with two slightly spaced openings 9 through which the strip 7 can be inserted as best illustrated in Fig. 1. The width of the strip 7 is so related to the diameter of the openings 9 that when the strip is threaded therethrough the material of the band completely fills the opening, in fact, slightly stretches the margin of the cap at the openings so that substantially no water leaks therethrough. These openings in the margins of the cap may be made by a punch or preferably by utilizing a novel type of form as disclosed in the above-mentioned application. The edge of the cap at each of these openings is preferably reinforced by an angular ridge or accumulation of rubber 10 which terminates in a torn or feather edge.

The cap of Fig. 1 may be worn as indicated in Fig. 8 wherein the band 7 is tied about the head of the wearer to provide a more effective seal against water entering between the margin of the cap and the head of the wearer. This band may be tied in various positions on the head to give different style effects and may be of contrasting color with that of the cap proper to present a decorative effect. The band itself may be provided with openings 11 therein (Fig. 5) which openings may be of any decorative shape such as diamond shape, heart shape, circular, etc., so that the color of the cap is visible therethrough as a contrasting background.

In the modified form of the invention shown in Fig. 9, the cap 5a is provided with a reinforcing marginal bead 6a and with an integral tab 12 projecting below the margin proper thereof, which tab has a pair of slightly spaced openings 9a therein to receive the strip 7. The margins of these openings are preferably reinforced by angular ridges or accumulations of rubber as described above.

While the securing strip 7 in its various modified forms has been illustrated in Fig. 8 as being tied about the head of the wearer, it will be understood that the ends of the strip may be fastened together by means of a snap fastener or the ends of this strip may be permanently secured together by a suitable adhesive.

From the foregoing it will be seen that the present invention provides a bathing cap having a tying strip whereby the margin of the cap at the head opening therein may be tied snugly about the head of the wearer to afford a substantially water tight seal. The tying strip since it may be made of contrasting colors, lends itself to affording different style effects and decorative arrangements.

What I claim is:

A deposited rubber cap having a margin defining a head opening, said cap having a pair of openings therein adjacent said margin, a relatively long strip of deposited rubber inserted through said openings, portions of the margin of said strip being strengthened by reinforcements of rubber integral therewith said strip having a width sufficient to substantially fill said openings whereby the strip is held in adjusted position on the cap and leakage through said openings is substantially prevented.

ABRAHAM N. SPANEL.

CERTIFICATE OF CORRECTION.

Patent No. 2,147,504. February 14, 1939.

ABRAHAM N. SPANEL.

It is hereby certified that error appears in the printed specification of the above numbered patent requiring correction as follows: Page 2, first column, line 11, in the claim, for "a margin" read an integrally reinforced margin; and that the said Letters Patent should be read with this correction therein that the same may conform to the record of the case in the Patent Office.

Signed and sealed this 28th day of March, A. D. 1939.

Henry Van Arsdale (Seal)

Acting Commissioner of Patents.

From the foregoing it will be seen that the present invention provides a bathing cap having a tying strip whereby the margin of the cap at the head opening therein may be tied snugly about the head of the wearer to afford a substantially water tight seal. The tying strip since it may be made of contrasting colors, lends itself to affording different style effects and decorative arrangements.

What I claim is:

A deposited rubber cap having a margin defining a head opening, said cap having a pair of openings therein adjacent said margin, a relatively long strip of deposited rubber inserted through said openings, portions of the margin of said strip being strengthened by reinforcements of rubber integral therewith said strip having a width sufficient to substantially fill said openings whereby the strip is held in adjusted position on the cap and leakage through said openings is substantially prevented.

ABRAHAM N. SPANEL.

CERTIFICATE OF CORRECTION.

Patent No. 2,147,504.     February 14, 1939.

ABRAHAM N. SPANEL.

It is hereby certified that error appears in the printed specification of the above numbered patent requiring correction as follows: Page 2, first column, line 11, in the claim, for "a margin" read an integrally reinforced margin; and that the said Letters Patent should be read with this correction therein that the same may conform to the record of the case in the Patent Office.

Signed and sealed this 28th day of March, A. D. 1939.

Henry Van Arsdale (Seal)

Acting Commissioner of Patents.